(12) United States Patent
Kobayashi et al.

(10) Patent No.: US 9,199,633 B2
(45) Date of Patent: Dec. 1, 2015

(54) CONTROL DEVICE FOR HYBRID VEHICLE

(75) Inventors: Nobufusa Kobayashi, Anjo (JP); Toshio Sugimura, Nagoya (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/364,596

(22) PCT Filed: Dec. 16, 2011

(86) PCT No.: PCT/JP2011/079247
§ 371 (c)(1),
(2), (4) Date: Jun. 24, 2014

(87) PCT Pub. No.: WO2013/088576
PCT Pub. Date: Jun. 20, 2013

(65) Prior Publication Data
US 2015/0080175 A1 Mar. 19, 2015

(51) Int. Cl.
| | | |
|---|---|---|
| *B60W 10/08* | (2006.01) | |
| *B60W 20/00* | (2006.01) | |
| *B60K 6/48* | (2007.10) | |
| *B60K 6/547* | (2007.10) | |
| *B60W 10/06* | (2006.01) | |
| *B60W 10/02* | (2006.01) | |
| *F02D 29/02* | (2006.01) | |
| *F02N 11/08* | (2006.01) | |

(52) U.S. Cl.
CPC .............. *B60W 20/10* (2013.01); *B60K 6/48* (2013.01); *B60K 6/547* (2013.01); *B60W 10/02* (2013.01); *B60W 10/06* (2013.01); *B60W 10/08* (2013.01); *B60W 20/40* (2013.01); *F02D 29/02* (2013.01); *F02N 11/0814* (2013.01); *B60W 2540/10* (2013.01); *B60W 2710/023* (2013.01); *B60W 2710/083* (2013.01); *F02N 2300/104* (2013.01); *Y02T 10/48* (2013.01); *Y02T 10/6221* (2013.01); *Y02T 10/6286* (2013.01); *Y10S 903/93* (2013.01)

(58) Field of Classification Search
None
See application file for complete search history.

(56) References Cited

U.S. PATENT DOCUMENTS

| | | | | |
|---|---|---|---|---|
| 7,885,737 | B2 * | 2/2011 | Hirata et al. ................ | 701/22 |
| 8,113,309 | B2 * | 2/2012 | Allgaier .................. | 180/65.265 |
| 8,651,998 | B2 * | 2/2014 | Schenk et al. ................ | 477/5 |
| 2008/0071437 | A1 | 3/2008 | Hirata et al. | |
| 2009/0224713 | A1 | 9/2009 | Falkenstein | |

(Continued)

FOREIGN PATENT DOCUMENTS

| | | |
|---|---|---|
| JP | 2000204999 A | 7/2000 |
| JP | 2007-69790 A | 3/2007 |

(Continued)

*Primary Examiner* — Dirk Wright
(74) *Attorney, Agent, or Firm* — Sughrue Mion, PLLC

(57) ABSTRACT

A control device of a hybrid vehicle includes an engine, an electric motor configured to output power for running and power necessary for starting the engine, and a connecting/disconnecting clutch connecting/disconnecting a power transmission path between the engine and the electric motor, and the control device is configured to start the engine while the connecting/disconnecting clutch is controlled toward engagement during motor running for running by using only the electric motor as a drive force source for running with the connecting/disconnecting clutch released.

When the engine is started in association with an increase in a drive request amount to the hybrid vehicle, if the drive request amount is large, the power for running from the electric motor during start of the engine is made smaller as compared to the case that the drive request amount is small

5 Claims, 5 Drawing Sheets

(56) References Cited

U.S. PATENT DOCUMENTS

| | | | | |
|---|---|---|---|---|
| 2013/0331228 A1* | 12/2013 | Miyazaki et al. | ................ | 477/5 |
| 2014/0018207 A1* | 1/2014 | Kobayashi et al. | ................ | 477/5 |
| 2014/0379232 A1* | 12/2014 | Kobayashi et al. | ............. | 701/67 |

FOREIGN PATENT DOCUMENTS

| JP | 2007-160991 A | 6/2007 |
|---|---|---|
| JP | 2008-179283 A | 8/2008 |
| JP | 2009-74593 A | 4/2009 |
| JP | 2009-227277 A | 10/2009 |
| JP | 2010-505684 A | 2/2010 |
| JP | 2010-149783 A | 7/2010 |
| JP | 2011-213310 A | 10/2011 |

* cited by examiner

CONTROL DEVICE FOR HYBRID VEHICLE

CROSS REFERENCE TO RELATED APPLICATIONS

This application is a National Stage of International Application No. PCT/JP2011/079247, filed on Dec. 16, 2011, the contents of all of which are incorporated herein by reference in their entirety.

TECHNICAL FIELD

The present invention relates to a control device of a hybrid vehicle including an engine and an electric motor as well as a connecting/disconnecting clutch connecting/disconnecting a power transmission path between the engine and the electric motor.

BACKGROUND ART

A hybrid vehicle is well known that includes an engine, an electric motor capable of outputting power for running and power necessary for starting the engine, and a connecting/disconnecting clutch connecting/disconnecting a power transmission path between the engine and the electric motor. For example, this corresponds to a hybrid vehicle described in Patent Document 1. Such a hybrid vehicle is generally capable of motor running (EV running) for running by using only the electric motor as a drive force source for running with the connecting/disconnecting clutch released and engine running (EHV running) for running by using at least the engine as the drive force source for running with the connecting/disconnecting clutch engaged. If a start of the engine is determined during the EV running based on a drive request amount (e.g., request drive torque, request drive force, and request drive power) for a vehicle, the connecting/disconnecting clutch is controlled toward engagement and the engine is started for a switchover to the EHV running. For example, in a technique proposed in Patent Document 1, when the engine is started in association with an increase in a drive request amount during the EV running, the engine is started while the drive request amount is realized by the electric motor within a drive request amount range in which the EV running can be performed.

PRIOR ART DOCUMENTS

Patent Documents

Patent Document 1: Japanese Laid-Open Patent Publication No. 2007-69790
Patent Document 2: Japanese Laid-Open Patent Publication No. 2009-227277
Patent Document 3: Japanese Laid-Open Patent Publication No. 2007-160991

SUMMARY OF THE INVENTION

Problem to Be Solved by the Invention

When the engine is started in association with an increase in the drive request amount, if the drive request amount is realized in the EV running as much as possible (in other words, if it is attempted to satisfy the drive request amount by the electric motor as much as possible), a differential rotation speed of the connecting/disconnecting clutch (=output side rotation speed (e.g., electric motor rotation speed)-input side rotation speed (e.g., engine rotation speed)) increases in conjunction with a rise in vehicle speed, for example. This leads to lengthening of a time until engagement of the connecting/disconnecting clutch at the engine start, causing a delay in the engine start, and it takes longer time until an engine torque becomes transmittable to a subsequent stage. Therefore, when it is attempt to satisfy the drive request amount as much as possible by the electric motor having a torque rising with better responsiveness than the engine, an initial drive torque rises earlier in response to an increase in the drive request amount; however, this may delay attainment of a final engine torque that should satisfy the drive request amount only with the engine. It is considered that such a problem is more likely to occur when the drive request amount is larger. In a vehicle with a fluid transmission device such as a torque converter disposed on a subsequent stage side of the electric motor, since the rotation speed of the electric motor easily rises and the differential rotation speed of the connecting/disconnecting clutch easily becomes larger, the problem is more likely to occur and, moreover, a power of the electric motor is consumed by a slip of the fluid transmission device (i.e., a rise in the rotation speed of the electric motor) and generation of the initial drive torque may tend to delay. The problem described above is unknown and no proposal has hitherto been made on starting the engine such that a drive force is generated without a sense of discomfort in accordance with an increase in the drive request amount.

The present invention was conceived in view of the situations and it is therefore an object of the present invention to provide a control device of a hybrid vehicle capable of realizing a drive request amount without a sense of discomfort at the engine start associated with an increase in the drive request amount.

Means for solving the Problem

To achieve the object, the first aspect of the invention provides (a) a control device of a hybrid vehicle including an engine, an electric motor configured to output power for running and power necessary for starting the engine, and a connecting/disconnecting clutch connecting/disconnecting a power transmission path between the engine and the electric motor, the control device configured to start the engine while the connecting/disconnecting clutch is controlled toward engagement during motor running for running by using only the electric motor as a drive force source for running with the connecting/disconnecting clutch released, wherein (b) when the engine is started in association with an increase in a drive request amount to the hybrid vehicle, if the drive request amount is large, the power for running from the electric motor during start of the engine is made smaller as compared to the case that the drive request amount is small.

Effects of the Invention

Consequently, at the engine start when the drive request amount is relatively small, a large portion of the drive request amount can be satisfied by the power from the electric motor and, therefore, even if satisfying the drive request amount only by power from the engine is delayed, a sense of discomfort is hardly generated. In this regard, the power for running from the electric motor during start of the engine is made relatively larger so that a large portion of the drive request amount can promptly be satisfied by the power for running from the electric motor although the responsiveness of the engine start is reduced, which improves the initial follow-up performance to an increase in the drive request amount. On the other hand, at the engine start when the drive request amount is relatively large, a large portion of the drive request amount cannot be satisfied by the power from the electric motor and, therefore, if satisfying the drive request amount only by power from the engine is delayed, a sense of discomfort is easily generated. In this regard, the power for running from the electric motor during start of the engine is made relatively smaller so as to suppress an increase in the differential rotation speed of the connecting/disconnecting clutch and engage the connecting/disconnecting clutch relatively earlier and, although the initial follow-up performance to an increase in the drive request amount is reduced, the responsiveness of the engine start is improved and the drive request amount is promptly realized only by the engine. Therefore, the drive request amount can be realized without a sense of discomfort at the engine start associated with an increase in the drive request amount.

The second aspect of the invention provides the control device of a hybrid vehicle recited in the first aspect of the invention, wherein if the drive request amount is equal to or less than a predetermined value, the power for running from the electric motor during start of the engine is permitted to be up to predefined upper limit electric motor power at which the motor running can be performed, and wherein if the drive request amount is larger than the predetermined value, the power for running from the electric motor during start of the engine is made smaller than the upper limit electric motor power when the drive request amount is larger. Consequently, at the engine start when the drive request amount is equal to or less than the predetermined value, a large portion of the drive request amount can promptly be satisfied by the power for running from the electric motor and the initial follow-up performance to an increase in the drive request amount is properly improved. On the other hand, at the engine start when the drive request amount is larger than the predetermined value, the differential rotation speed of the connecting/disconnecting clutch is more restrained from increasing and the connecting/disconnecting clutch is engaged relatively earlier when the drive request amount is larger, and the responsiveness of the engine start is improved and the drive request amount is promptly realized only by the engine.

The third aspect of the invention provides the control device of a hybrid vehicle recited in the second aspect of the invention, wherein the predetermined value is a power limitation determination value of the electric motor defined in advance as an upper limit value of the drive request amount at which a sense of discomfort is not generated even if generation of power for running from the engine is delayed. Consequently, the drive request amount can properly be realized without a sense of discomfort at the engine start associated with an increase in the drive request amount.

The fourth aspect of the invention provides the control device of a hybrid vehicle recited in any one of the first to third aspects of the invention, wherein when the engine is started, if a rotation speed of the electric motor is lower, the power for running from the electric motor during start of the engine is made smaller as compared to the case that the rotation speed of the electric motor is higher. Consequently, if the rotation speed of the electric motor is lower, the rotation speed of the electric motor easily rises and the differential rotation speed of the connecting/disconnecting clutch easily increases. In this regard, the power for running from the electric motor during start of the engine is made relatively smaller to suppress the increase in the differential rotation speed of the connecting/disconnecting clutch and engage the connecting/disconnecting clutch relatively earlier, which improves the responsiveness of the engine start.

The fifth aspect of the invention provides the control device of a hybrid vehicle recited in any one of the first to fourth aspects of the invention, wherein a fluid transmission device is disposed in a power transmission path between the electric motor and drive wheels. Consequently, if the fluid transmission device is disposed, the rotation speed of the electric motor easily rises and the differential rotation speed of the connecting/disconnecting clutch easily increases. In this regard, the power for running from the electric motor during start of the engine is made relatively smaller to suppress the increase in the differential rotation speed of the connecting/disconnecting clutch and engage the connecting/disconnecting clutch relatively earlier, which improves the responsiveness of the engine start. Although if the fluid transmission device is disposed, the power for running from the electric motor is consumed by a rise in the rotation speed of the electric motor and hardly sent toward the drive wheels, since the power for running from the electric motor during start of the engine is made relatively smaller, the increase in the rotation speed of the electric motor is suppressed and the initial power for running from the electric motor is more easily sent toward the drive wheels.

MODE FOR CARRYING OUT THE INVENTION

In the present invention, preferably, the hybrid vehicle further includes a transmission coupled to the electric motor in a power transmittable manner and transmitting power from a drive force source for running (the engine, the electric motor) toward drive wheels. This transmission is made up of a manual transmission, an automatic transmission having the fluid transmission device, or an automatic transmission having an auxiliary transmission. This automatic transmission is made up of a known planetary gear automatic transmission having a plurality of sets of rotating elements of a planetary gear device selectively coupled by engagement devices to achieve a plurality of gear stages in an alternative manner; a synchronous meshing type parallel two-shaft automatic transmission that is a synchronous meshing type parallel two-shaft transmission including pairs of always meshing change gears between two shafts and that has gear stages automatically switched by a hydraulic actuator; a so-called DCT (Dual Clutch Transmission) that is a synchronous meshing type parallel two-shaft automatic transmission and that is a transmission of a type having two systems of input shafts; a so-called belt type continuously variable transmission and a so-called toroidal type continuously variable transmission having gear ratios varied continuously in a stepless manner, etc.

Preferably, for example, an internal combustion engine such as a gasoline engine and a diesel engine generating power from combustion of fuel is widely used as the engine.

Preferably, a wet or dry engagement device is used as the connecting/disconnecting clutch.

An example of the present invention will now be described in detail with reference to the drawings.

EXAMPLE

Figure 1:
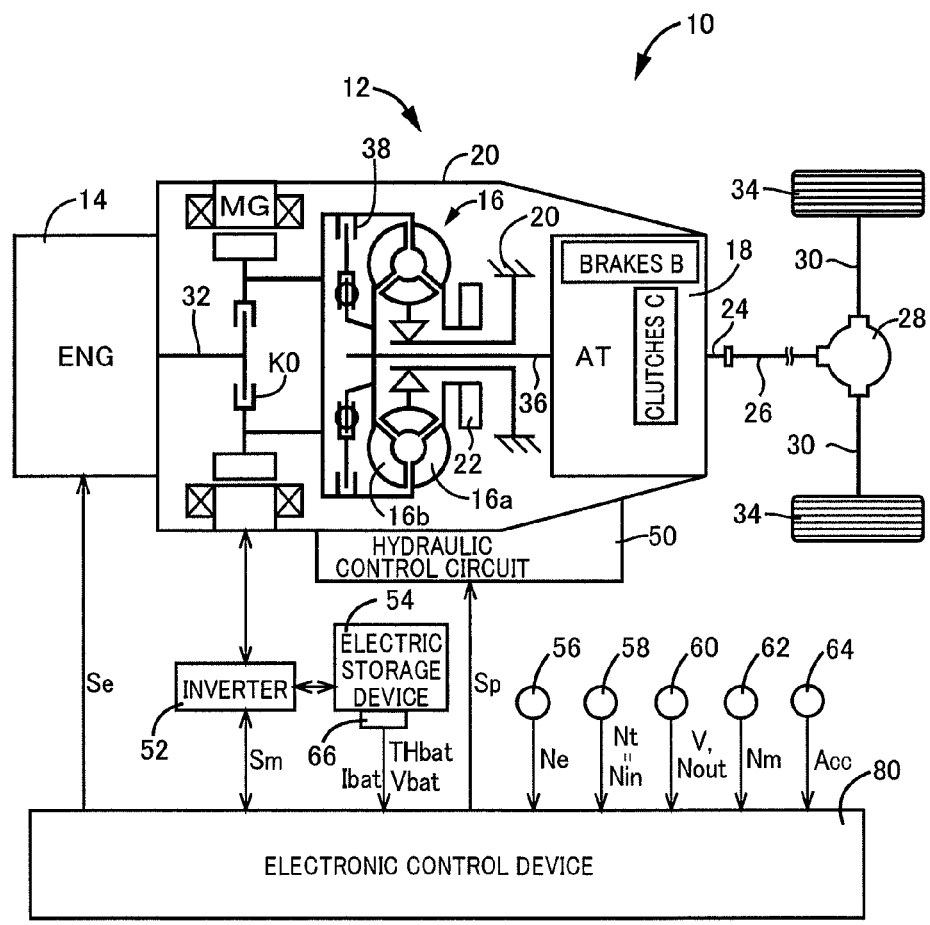
FIG. 1 is a diagram for explaining a general configuration of a power transmission path making up a hybrid vehicle to which the present invention is applied, and is a diagram for explaining a main portion of a control system disposed in the vehicle.

FIG. 1 is a diagram for explaining a general configuration of a power transmission path from an engine 14 to drive wheels 34 making up a hybrid vehicle 10 (hereinafter referred to as a vehicle 10) to which the present invention is applied, and is a diagram for explaining a main portion of a control system disposed in the vehicle 10 for output control of the engine 14 acting as a drive force source for running, shift control of an automatic transmission 18, drive control of an electric motor MG acting as a drive force source for running, etc.

In FIG. 1, a vehicle power transmission device 12 (hereinafter referred to as a power transmission device 12) includes in a transaxle case 20 (hereinafter referred to as a case 20) acting as a non-rotating member, in order from the engine 14 side, an engine connecting/disconnecting clutch K0, the electric motor MG, a torque converter 16, an oil pump 22, and the automatic transmission 18. The power transmission device 12 also includes a propeller shaft 26 coupled to a transmission output shaft 24 that is an output rotating member of the automatic transmission 18, a differential gear device (differential gear) 28 coupled to the propeller shaft 26, a pair of axles 30 coupled to the differential gear device 28, etc. The power transmission device 12 configured as described above is preferably used in the vehicle 10 of the FR (front-engine rear-drive) type, for example. In the power transmission device 12, if the engine connecting/disconnecting clutch K0 is engaged, a power of the engine 14 is transmitted from an engine coupling shaft 32 coupling the engine 14 and the engine connecting/disconnecting clutch K0, sequentially through the engine connecting/disconnecting clutch K0, the torque converter 16, the automatic transmission 18, the propeller shaft 26, the differential gear device 28, the pair of the axles 30, etc., to a pair of the drive wheels 34.

The torque converter 16 is a fluid transmission device transmitting power (having the same meaning as torque and output if not particularly distinguished) input to a pump impeller 16*a*, from a turbine impeller 16*b* coupled to a transmission input shaft 36 via fluid toward the automatic transmission 18. The torque converter 16 includes a lockup clutch 38 directly coupling the pump impeller 16*a* and the turbine impeller 16*b*. The pump impeller 16*a* is coupled to the oil pump 22. The oil pump 22 is a mechanical oil pump rotationally driven by the engine 14 (or the electric motor MG) to generate an operating oil pressure for providing the shift control of the automatic transmission 18 and controlling engagement/release of the engine connecting/disconnecting clutch K0.

The electric motor MG is a so-called motor generator having a function of a motor generating mechanical power from electric energy and a function of an electric generator generating electric energy from mechanical energy. In other words, the electric motor MG may act as a drive force source for running generating power for running instead of the engine 14 that is a power source or along with the engine 14. The electric motor MG also performs operations such as generating electric energy through regeneration from the power generated by the engine 14 or a driven force (mechanical energy) input from a side of the drive wheels 34 to accumulate the electric energy via an inverter 52 into an electric storage device 54. The electric motor MG is coupled to a power transmission path between the engine connecting/disconnecting clutch K0 and the torque converter 16 (i.e., operatively coupled to the pump impeller 16*a*) and power is mutually transmitted between the electric motor MG and the pump impeller 16*a*. Therefore, the electric motor MG is coupled to the transmission input shaft 36 that is an input rotating member of the automatic transmission 18 in a power transmittable manner as is the case with the engine 14.

The engine connecting/disconnecting clutch K0 is a wet multi-plate type hydraulic friction engagement device in which a plurality of friction plates overlapped with each other is pressed by a hydraulic actuator, for example, and is subjected to engagement/release control by a hydraulic control circuit 50 disposed in the power transmission device 12 by using an oil pressure generated by the oil pump 22 as an original pressure. In the engagement/release control, a torque capacity of the engine connecting/disconnecting clutch K0 is varied, for example, continuously, through pressure adjustment of a linear solenoid valve etc., in the hydraulic control circuit 50. The engine connecting/disconnecting clutch K0 includes a pair of clutch rotating members (a clutch hub and a clutch drum) relatively rotatable in a released state thereof and one of the clutch rotating members (the clutch hub) is relatively non-rotatably coupled to the engine coupling shaft 32 while the other clutch rotating member (the clutch drum) is relatively non-rotatably coupled to the pump impeller 16*a* of the torque converter 16. Because of such a configuration, the engine connecting/disconnecting clutch K0 rotates the pump impeller 16*a* integrally with the engine 14 via the engine coupling shaft 32 in an engaged state. Therefore, in the engaged state of the engine connecting/disconnecting clutch K0, the power from the engine 14 is input to the pump impeller 16*a*. On the other hand, in the released state of the engine connecting/disconnecting clutch K0, a power transmission between the pump impeller 16*a* and the engine 14 is interrupted. As described above, since the electric motor MG is operatively coupled to the pump impeller 16*a*, the engine connecting/disconnecting clutch K0 obviously acts as a clutch connecting/disconnecting a power transmission path between the engine 14 and the torque converter 16 and also acts as a connecting/disconnecting clutch connecting/disconnecting a power transmission path between the engine 14 and the electric motor MG.

The automatic transmission 18 is coupled to the electric motor MG without via the engine connecting/disconnecting clutch K0 in a power transmittable manner and makes up a portion of a power transmission path from the electric motor MG to the drive wheels 34 to transmit the power from the drive force source for running (the engine 14 and the electric motor MG) toward the drive wheels 34. The automatic transmission 18 is a known planetary gear type multistage transmission having a plurality of shift stages (gear stages) selectively established through a shift made by engagement and release of a plurality of hydraulic friction engagement devices such as clutches C and brakes B, for example. In the automatic transmission 18, each of the clutches C and the brakes B is subjected to the engagement/release control by the hydraulic control circuit 50 to establish a predetermined gear stage depending on driver's accelerator operation, a vehicle speed V, etc.

Torque capacities of the engine connecting/disconnecting clutch K0, the clutches C, the brakes B, etc. are determined by a friction coefficient of friction material of the hydraulic friction engagement devices and an engagement oil pressure pressing friction plates, for example, and correspond to transmission torques enabling the engagement devices to transmit power. For example, the torque capacity of the engine connecting/disconnecting clutch K0 corresponds to a K0 transmission torque Tk enabling the engine connecting/disconnecting clutch K0 to transmit power. The friction coefficient of the friction material is not a constant value and varies depending on an operating oil temperature and a differential rotation speed of an engagement device itself. Therefore, the torque capacity of the engagement device and the engagement oil pressure do not necessarily correspond to each other one-to-one due to a delay in a rise of the friction coefficient relative to a rise of the engagement oil pressure etc.; however, in this example, the torque capacity of the engagement device and the engagement oil pressure may be treated as synonyms for convenience.

The vehicle 10 includes an electronic control device 80 including a control device of the vehicle 10 related to hybrid drive control, for example. The electronic control device 80 includes a so-called microcomputer including a CPU, a RAM, a ROM, and an I/O interface, for example, and the CPU executes signal processes in accordance with programs stored in advance in the ROM, while utilizing a temporary storage function of the RAM, to provide various controls of the vehicle 10. For example, the electronic control device 80 provides the output control of the engine 14, the drive control of the electric motor MG including regenerative control of the electric motor MG, the shift control of the automatic transmission 18, the torque capacity control of the engine connecting/disconnecting clutch K0, etc., and is configured separately as needed for the engine control, the electric motor control, the hydraulic control, etc. The electronic control device 80 is supplied with each of various signals (e.g., an engine rotation speed Ne that is a rotation speed of the engine 14, a turbine rotation speed Nt, i.e., a transmission input rotation speed Nin that is a rotation speed of the transmission input shaft 36, a transmission output rotation speed Nout that is a rotation speed of the transmission output shaft 24 corresponding to the vehicle speed V, an electric motor rotation speed Nm that is a rotation speed of the electric motor MG, an accelerator opening degree Acc corresponding to a drive request amount to the vehicle 10 from a driver, a battery temperature THbat, a battery input/output current (a battery charging/discharging current) Ibat, and a battery voltage Vbat of the electric storage device 54) detected by various sensors (e.g., an engine rotation speed sensor 56, a turbine rotation speed sensor 58, an output shaft rotation speed sensor 60, an electric motor rotation speed sensor 62, an accelerator opening degree sensor 64, and a battery sensor 66). The electronic control device 80 outputs, for example, an engine output control command signal Se for the output control of the engine 14, an electric motor control command signal Sm for controlling the operation of the electric motor MG, and an oil pressure command signal Sp for actuating an electric magnetic valve (solenoid valve) etc. included in the hydraulic control circuit 50 for controlling hydraulic actuators of the engine connecting/disconnecting clutch K0 and the clutches C and the brakes B of the automatic transmission 18, to engine control devices such as a throttle actuator and a fuel supply device, the inverter 52, and the hydraulic control circuit 50, respectively. The electronic control device 80 sequentially calculates a state of charge (charging capacity) SOC of the electric storage device 54 based on the battery temperature THbat, the battery charging/discharging current Ibat, and the battery voltage Vbat, for example.

Figure 2:
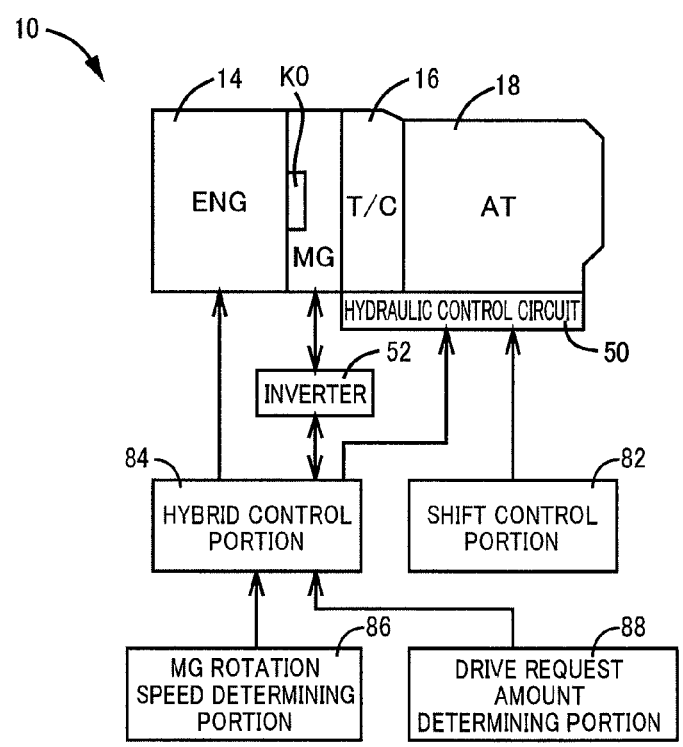
FIG. 2 is a functional block diagram for explaining a main portion of a control function of an electronic control device.

FIG. 2 is a functional block diagram for explaining a main portion of the control function of the electronic control device 80. In FIG. 2, a shift control means, i.e., a shift control portion 82, determines whether a shift of the automatic transmission 18 should be performed, i.e., determines a gear stage to be achieved by the automatic transmission 18, based on a vehicle state (e.g., an actual vehicle speed V and an accelerator opening degree Acc) from a known relationship (a shift diagram, a shift map) stored in advance by using the vehicle speed V and a drive request amount (e.g., the accelerator opening degree Acc) as variables, for example, and provides the automatic shift control of the automatic transmission 18 such that the determined gear stage is acquired.

A hybrid control means, i.e., a hybrid control portion 84, has a function as an engine drive control portion controlling drive of the engine 14 and a function as an electric motor operation control portion controlling the operations of the electric motor MG as a drive force source or an electric generator through the inverter 52, and provides control of the hybrid drive by the engine 14 and the electric motor MG through these control functions. For example, the hybrid control portion 84 calculates a request drive torque Touttgt as a drive request amount (i.e. a driver request amount) to the vehicle 10 based on the accelerator opening degree Acc and the vehicle speed V and controls the drive force source for running so as to achieve an output torque of the drive force source for running (the engine 14 and the electric motor MG) such that the request drive torque Touttgt is acquired in consideration of a transmission loss, an accessory load, a gear stage of the automatic transmission 18, the charge capacity SOC of the electric storage device 54, etc. The drive request amount can be implemented by using not only the request drive torque Touttgt at the drive wheels 34 but also a request drive force at the drive wheels 34, a request drive power at the drive wheels 34, a request transmission output torque at the transmission output shaft 24, a request transmission input torque at the transmission input shaft 36, a target toque of the drive force source for running (the engine 14 and the electric motor MG), etc. The drive request amount can be implemented by simply using the accelerator opening degree Acc, a throttle valve opening degree, an intake air amount, etc.

More specifically, for example, if the request drive torque Touttgt is within a range that can be covered solely by an output. torque (electric motor torque) Tm of the electric motor MG, i.e., if the request drive torque Touttgt is equal to or less than an EV upper limit torque Tmevlim defined in advance (i.e., obtained and stored in advance) as an upper limit electric motor torque at which a motor running can be performed, if the vehicle speed V is equal to or less than an EV upper limit vehicle speed defined in advance as an upper limit vehicle speed at which the motor running can be performed, and if the charge capacity SOC is equal to or greater than an EV permission capacity defined in advance as a lower limit charge capacity at which the motor running can be performed, the hybrid control portion 84 sets a running mode to a motor running mode (hereinafter, EV mode) and performs the motor running (EV running) for running with only the electric motor MG used as the drive force source for running. On the other hand, for example, if the request drive torque Touttgt exceeds a range that cannot be covered unless at least an output torque (engine torque) Te of the engine 14 is used, i.e., if the request drive torque Touttgt exceeds the EV upper limit torque Tmevlim, if the vehicle speed V exceeds the EV upper limit vehicle speed, or if the charge capacity SOC is less than the EV permission capacity, the hybrid control portion 84 sets a running mode to an engine running mode, i.e., a hybrid running mode (hereinafter, EHV mode), and performs an engine running, i.e., a hybrid running (EHV running), for running with at least the engine 14 used as the drive force source for running.

Figure 3:
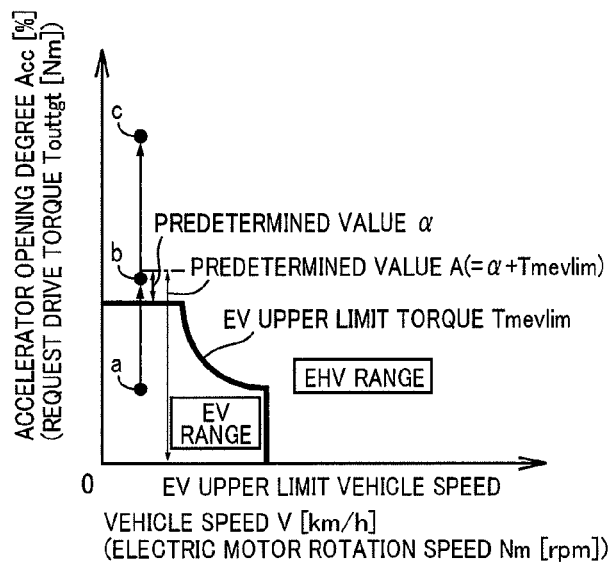
FIG. 3 is a diagram depicting an example of a relationship (EV/EHV range map) having an EV-EHV switch line defined in advance.

FIG. 3 is a diagram of a relationship (EV/EHV range map) having an EV-EHV switch line dividing a range into a motor running range (EV range) and an engine running range (EHV range) defined in advance in two-dimensional coordinates using the vehicle speed V and the drive request amount (accelerator opening degree Acc) as variables. The hybrid control portion 84 performs the EV running if the vehicle state (e.g., the actual vehicle speed V and the accelerator opening degree Acc) is within the EV range as indicated by a point a of FIG. 3, for example, and the charge capacity SOC is equal to or greater than the EV permission capacity, and performs the EHV running if the vehicle state is within the EHV range as indicated by a point b (or point c) of FIG. 3, for example, or if the charge capacity SOC is less than the EV permission capacity. Although the EV-EHV switch line in the EV/EHV range map of FIG. 3 is represented as a line for convenience, the line is a series of points represented by a vehicle state in terms of control. The EV-EHV switch line desirably includes an EV-to-EHV switch line at the time of a transition from the EV range to the EHV range and an EHV-to-EV switch line at the time of a transition from the EHV range to the EV range so that hysteresis is included.

If the EV running is performed, the hybrid control portion 84 releases the engine connecting/disconnecting clutch K0 to interrupt the power transmission path between the engine 14 and the torque converter 16 and causes the electric motor MG to output the electric motor torque Tm required for the EV running. On the other hand, if the EHV running is performed, the hybrid control portion 84 engages the engine connecting/disconnecting clutch K0 to connect the power transmission path between the engine 14 and the torque converter 16 and causes the engine 14 to output the engine torque Te required for the EHV running while causing the electric motor MG to output an assist torque as needed.

If a transition of the vehicle state is made from the EV range to the EHV range as indicated by the point a to the point b (or point c) of FIG. 3, for example, or if the charge capacity SOC becomes less than the EV permission capacity, during the EV running, the hybrid control portion 84 switches the running mode from the EV mode to the EHV mode, determines the initiation of a start of the engine 14, and starts the engine 14 to perform the EHV running. In a method of starting the engine 14 by the hybrid control portion 84, for example, the engine is started while the engine connecting/disconnecting clutch K0 is controlled toward engagement (from another viewpoint, while the engine 14 is rotationally driven by the electric motor MG).

In the method of starting the engine 14, an engine start torque Tms is required that is a torque necessary for starting the engine. The engine start torque Tms required for a prompt engine start is a torque corresponding to a total torque of a friction torque of the engine 14 (a compression torque corresponding to pumping loss+a mechanical friction torque corresponding to sliding friction) and engine inertia, for example. To improve acceleration responsiveness, the engine start torque Tms may be made larger when a target value of the engine torque Te after engagement of the engine connecting/disconnecting clutch K0 or a target value of the engine rotation speed Ne becomes larger in accordance with the drive request amount. The engine start torque Tms corresponds to an electric motor torque Tm going through the connecting/disconnecting clutch K0 toward the engine 14.

Therefore, when determining the initiation of the start of the engine 14, the hybrid control portion 84 outputs a command value (K0 clutch pressure command value) of an engagement oil pressure (K0 clutch pressure) of the engine connecting/disconnecting clutch K0 so as to acquire the K0 transmission torque Tk for transmitting the required engine start torque Tms toward the engine 14, thereby raising the engine rotation speed Ne. When it is determined that the engine rotation speed Ne is raised to a predetermined rotation speed enabling a complete explosion, the hybrid control portion 84 starts the engine 14 by initiating engine ignition, fuel supply, etc. When it is determined that the engine rotation speed Ne is increased to and synchronized with the electric motor rotation speed Nm by a self-sustaining operation of the engine 14 after the engine start, the hybrid control portion 84 outputs the K0 clutch pressure command value (e.g., a maximum K0 clutch pressure command value corresponding to the maximum value of the K0 clutch pressure) so as to acquire the K0 transmission torque Tk for properly transmitting the engine torque Te toward the drive wheels 34 (e.g., to acquire a final K0 transmission torque Tk for completely engaging the engine connecting/disconnecting clutch K0).

At the start of the engine 14, the hybrid control portion 84 outputs to the inverter 52 a command for outputting the electric motor torque Tm of the magnitude acquired by adding the electric motor torque Tm required as the engine start torque Tms to the electric motor torque Tm required for satisfying the request drive torque Touttgt, i.e., the electric motor torque Tm going toward the drive wheels 34 and used as the power for running with the electric motor MG (hereinafter referred to as an EV power running torque), so as to suppress a drop in a drive torque Tout. Since the method of starting the engine 14 of this example requires the engine start torque Tms, the EV running is desirably performed with reserve power left for the engine start torque Tms in preparation for the engine start. Therefore, the EV range is desirably set by using a torque acquired by subtracting the engine start torque Tms from a maximum electric motor torque Tmmax that can be output by the electric motor MG at a certain time point as an EV upper limit torque Tmevlim.

Description will be made of generating the drive torque Tout without a sense of discomfort in accordance with an increase in the drive request amount when the engine 14 is started in association with an increase in the drive request amount during the EV running. If the engine 14 is started in association with an increase in the drive request amount during the EV running, the drive torque Tout based on the engine toque Te is not generated as the power for running from the engine 14 until the engine 14 is started and the engine connecting/disconnecting clutch K0 is engaged. Therefore, it is conceivable that the drive request amount is satisfied by the electric motor MG as much as possible until the engine connecting/disconnecting clutch K0 is engaged. In other words, it is conceivable that the drive torque Tout is generated by the EV power running torque as much as possible, following an increase in the drive request amount. However, if the drive torque Tout is generated as much as possible before engagement of the engine connecting/disconnecting clutch K0, a clutch differential rotation speed $\Delta Nk(=Nm-Ne)$ of the engine connecting/disconnecting clutch K0 becomes larger in conjunction with a rise in the vehicle speed V, for example. This leads to lengthening of a time until engagement of the engine connecting/disconnecting clutch K0 and it takes longer time until the drive torque Tout based on the engine torque Te can be generated. As described above, when it is attempted to satisfy the drive request amount as much as possible by the electric motor MG having a torque rising with better responsiveness than the engine 14, initial follow-up performance of the drive torque Tout is improved in response to an increase in the drive request amount; however, this may delay attainment of a final engine torque Te that should satisfy the drive request amount only with the engine 14. Particularly, since the vehicle 10 of this example has the torque converter 16 disposed in a power transmission path between the electric motor MG and the drive wheels 34, the electric motor rotation speed Nm is easily raised by the EV power running torque and a phenomenon of increase in the clutch differential rotation speed ΔNk remarkably appears. Additionally, the EV power running torque may be consumed by a slip of the torque converter 16 (i.e., a rise in the electric motor rotation speed Nm) and hardly sent toward the drive wheels 34 and substantial generation of the drive torque Tout may be delayed.

On the other hand, as indicated by the points b and c of FIG. 3, the increase in the drive request amount resulting in a determination of an engine start is not uniform. Specifically, in a vehicle state as indicated by the point b of FIG. 3, the drive request amount is smaller and a difference is smaller between the final engine torque Te that should satisfy the drive request amount and the EV upper limit torque Tmevlim as compared to a vehicle state as indicated by the point c of FIG. 3. Therefore, if the drive torque Tout is generated as much as possible by the EV power running torque during the engine start, the follow-up performance to the increasing of the drive request amount is improved and a large portion of the drive request amount is satisfied during the engine start and, therefore, even if the attainment of the final engine torque Te is delayed, a sense of discomfort is hardly generated due to increase of the drive request amount. In contrast, in the vehicle state as indicated by the point c of FIG. 3, the drive request amount is larger and a difference is larger between the final engine torque Te that should satisfy the drive request amount and the EV upper limit torque Tmevlim as compared to the vehicle state as indicated by the point b of FIG. 3. Therefore, even if the drive torque Tout is generated as much as possible by the EV power running torque during the engine start, since a large portion of the drive request amount cannot be satisfied and the attainment of the final engine torque Te is delayed, a sense of discomfort is easily generated due to increase of the drive request amount. On the contrary, it is contemplated that a sense of discomfort due to increase of the drive request amount is hardly generated when the attainment of the final engine torque Te is advanced by decreasing the EV power running torque to suppress the increase in the clutch differential rotation speed ΔNk during the engine start even though the initial follow-up performance is reduced.

Therefore, to realize the drive request amount without a sense of discomfort when the engine 14 is started in association with an increase in the drive request amount, when the drive request amount is larger, the electronic control device 80 of this example makes the EV power running torque smaller during the engine start as compared to when the drive request amount is smaller.

On the other hand, it is considered that if the electric motor rotation speed Nm is lower, a sharp rise of the electric motor rotation speed Nm is larger when the drive request amount is increased, as compared to the case that the electric motor rotation speed Nm is higher. Therefore, if the electric motor rotation speed Nm is lower, the phenomenon of increase in the clutch differential rotation speed ΔNk easily appears. Thus, to realize the drive request amount without a sense of discomfort when the engine 14 is started in association with an increase in the drive request amount, when the electric motor rotation speed Nm is lower, the electronic control device 80 of this example makes the EV power running torque smaller during the engine start as compared to when the electric motor rotation speed Nm is higher.

More specifically, returning to FIG. 2, if the hybrid control portion 84 determines a switchover from the EV mode to the EHV mode during the EV running (i.e., initiation of the start of the engine 14), an MG rotation speed determining means, i.e., an MG rotation speed determining portion 86 determines whether the electric motor rotation speed Nm is less than a predetermined value β. The predetermined value β is a low-rotation determination value of the electric motor MG empirically defined in advance as a lower limit value of the electric motor rotation speed Nm at which the clutch differential rotation speed ΔNk hardly increases due to a sharp rise of the electric motor rotation speed Nm even if the EV power running torque increases, for example.

If the hybrid control portion 84 determines a switchover from the EV mode to the EHV mode during the EV running (i.e., initiation of the start of the engine 14), a drive request amount determining means, i.e., a drive request amount determining portion 88 determines whether a torque difference ΔTehv(=Touttgt−Tmevlim) between the request drive torque Touttgt and the EV upper limit torque Tmevlim is larger than a predetermined value α. From another viewpoint, the drive request amount determining portion 88 determines whether the request drive torque Touttgt is larger than a predetermined value A(=Tmevlim+α) acquired by adding the predetermined value α to the EV upper limit torque Tmevlim (see FIG. 3). The predetermined value a is a power limitation determination value of the electric motor MG empirically defined in advance as an upper limit value of the torque difference ΔTehv at which a sense of discomfort is not generated even if the generation of the engine torque Te is delayed, for example. The predetermined value A is a power limitation determination value of the electric motor MG empirically defined in advance as an upper limit value of the drive request amount (request drive torque Touttgt) at which a sense of discomfort is not generated even if the generation of the engine torque Te is delayed, for example.

If the MG rotation speed determining portion 86 determines that the electric motor rotation speed Nm is equal to or greater than the predetermined value β or if the drive request amount determining portion 88 determines that the torque difference ΔTehv is equal to or less than the predetermined value α (i.e., that the request drive torque Touttgt is equal to or less than the predetermined value A), the hybrid control portion 84 does not limit the EV power running torque during the engine start (while the engine connecting/disconnecting clutch K0 is controlled toward engagement) and permits the EV power running torque to be up to the EV upper limit torque Tmevlim Therefore, if the switchover from the EV mode to the EHV mode is determined in accordance with an increase in the drive request amount, the hybrid control portion 84 allows the EV power running torque to follow the request drive torque Touttgt up to the EV upper limit torque Tmevlim during starting of the engine.

Figure 4:
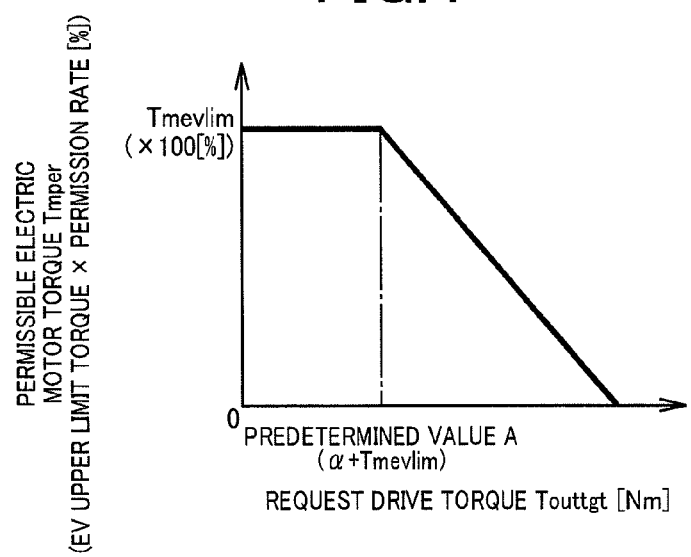
FIG. 4 is a diagram depicting an example of a predefined relationship (permissible electric motor torque map) between a request drive torque and a permissible electric motor torque.

On the other hand, if the MG rotation speed determining portion 86 determines that the electric motor rotation speed Nm is less than the predetermined value β and the drive request amount determining portion 88 determines that the torque difference ΔTehv is larger than the predetermined value α (i.e., that the request drive torque Touttgt is larger than the predetermined value A), the hybrid control portion 84 makes the EV power running torque during the engine start smaller than the EV upper limit torque Tmevlim when the drive request amount is larger, as depicted in FIG. 4, for example. FIG. 4 is a diagram of a predefined relationship (permissible electric motor torque map) between the request drive torque Touttgt and a permissible electric motor torque Tmper permitted as the EV power running torque during the engine start. In FIG. 4, in a range with the request drive torque Touttgt set equal to or less than the predetermined value A, a permission rate for the EV upper limit torque Tmevlim is 100 [%] and the permissible electric motor torque Tmper is set to the EV upper limit torque Tmevlim. Therefore, if the request drive torque Touttgt is set equal to or less than the predetermined value A, the EV power running torque is permitted to be up to the EV upper limit torque Tmevlim. On the other hand, in a range with the request drive torque Touttgt set larger than the predetermined value A, the permission rate is gradually reduced from 100 [%] as the request drive torque Touttgt is made larger and the permissible electric motor torque Tmper is gradually reduced from the EV upper limit torque Tmevlim. Therefore, if the request drive torque Touttgt is set larger than the predetermined value A, the EV power running torque is permitted to be up to the permissible electric motor torque Tmper made smaller than the EV upper limit torque Tmevlim as the request drive torque Touttgt is made larger.

Figure 5:
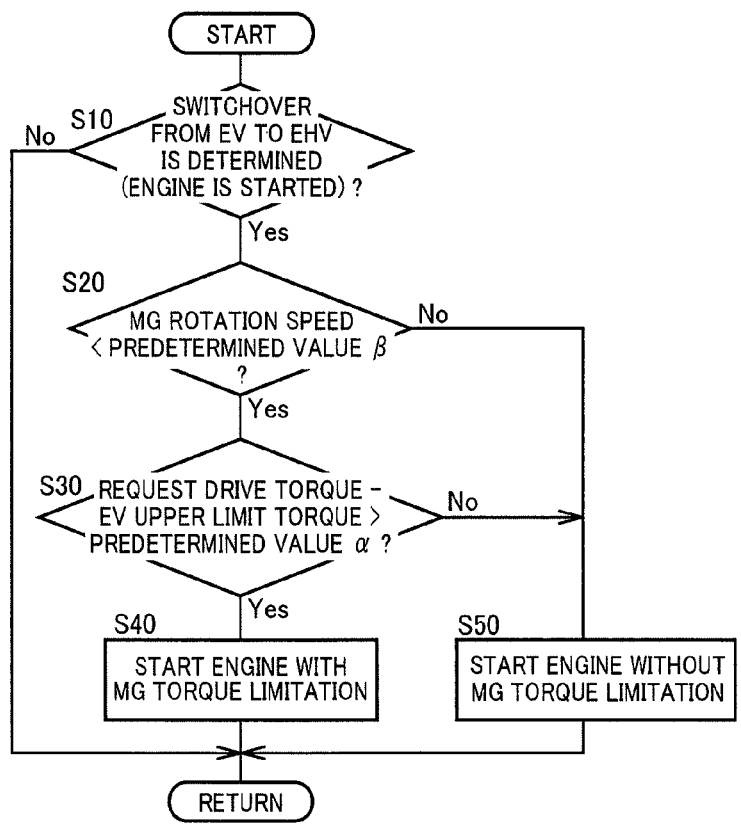
FIG. 5 is a flowchart for explaining a main portion of a control operation of the electronic control device, i.e., a control operation for realizing a drive request amount without a sense of discomfort at the engine start associated with an increase in the drive request amount.
Figure 6:
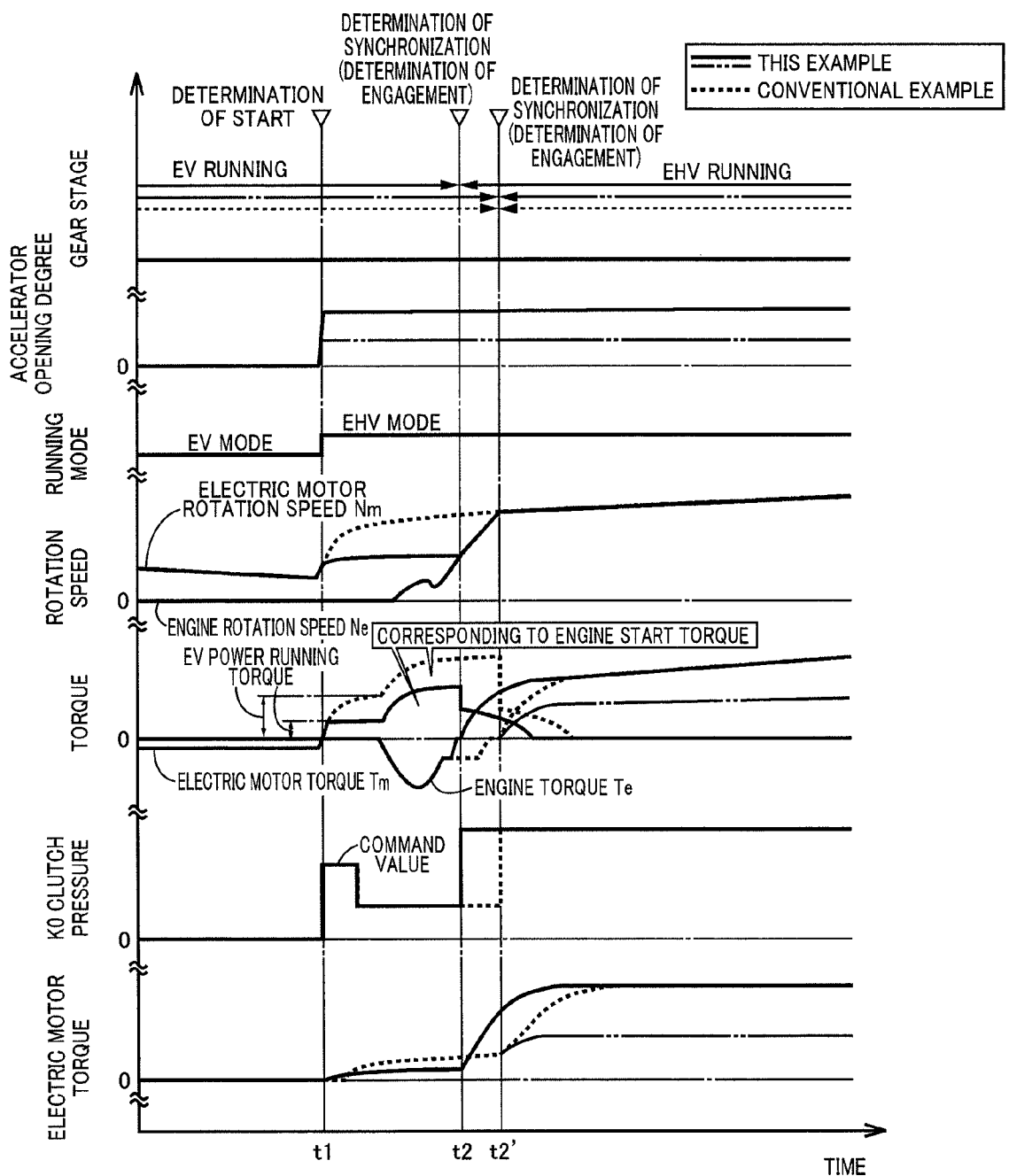
FIG. 6 is a time chart when the control operation depicted in the flowchart of FIG. 5 is executed.

FIG. 5 is a flowchart for explaining a main portion of the control operation of the electronic control device 80, i.e., the control operation for realizing the drive request amount without a sense of discomfort at the engine start associated with an increase in the drive request amount, and is repeatedly executed with an extremely short cycle time, for example, on the order of a few msec to a few tens of msec. The flowchart of FIG. 5 is executed during the EV running, for example. FIG. 6 is a time chart when the control operation depicted in the flowchart of FIG. 5 is executed.

In FIG. 5, first, at step (hereinafter, "step" will be omitted) S10 corresponding to the hybrid control portion 84, for example, a switchover from the EV mode to the EHV mode (i.e., initiation of the start of the engine 14) is determined. If the determination of S10 is negative, this routine is terminated and, if affirmative, at S20 corresponding to the MG rotation speed determining portion 86, it is determined whether the electric motor rotation speed Nm is less than the predetermined value $\beta$ (time t1 of FIG. 6). If the determination of S20 is affirmative, at S30 corresponding to the drive request amount determining portion 88, it is determined whether the torque difference $\Delta$Tehv between the request drive torque Touttgt and the EV upper limit torque Tmevlim is larger than the predetermined value $\alpha$ (time t1 of FIG. 6). If the determination of S30 is affirmative, at S40 corresponding to the hybrid control portion 84, the EV power running torque during the engine start is made smaller than the EV upper limit torque Tmevlim when the drive request amount is larger. For example, as depicted in FIG. 4, the EV power running torque during the engine start is permitted to be up to the permissible electric motor torque Tmper made smaller than the EV upper limit torque Tmevlim as the request drive torque Touttgt is made larger (see a solid line from time t1 to time t2 of FIG. 6). On the other hand, if the determination of S20 is negative or if the determination of S30 is negative, at S50 corresponding to the hybrid control portion 84, the EV power running torque during the engine start is not limited and the EV power running torque is permitted to be up to the EV upper limit torque Tmevlim (see a broken line from time t1 to time t2' of FIG. 6).

The time chart of FIG. 6 depicts an example of the case that the engine 14 is started because an accelerator is operated during the EV running that is deceleration running with the accelerator non-operated, for example. Solid and broken lines of FIG. 6 represent the case of the engine start associated with an accelerator operation making the request drive torque Touttgt larger than the predetermined value A and the solid and broken lines correspond to this example and a conventional example, respectively. Dashed-two dotted lines of FIG. 6 represent this example in the case of the engine start associated with an accelerator operation making the request drive torque Touttgt equal to or smaller than the predetermined value A. This example indicated by the dashed-two dotted lines is the same as the conventional example indicated by the broken lines from time t1 to time t2' except the section of accelerator opening degree. In FIG. 6, in the conventional example indicated by the broken lines, since the EV power running torque is not limited during the engine start regardless of a relatively large request drive torque Touttgt, the engine start is delayed (an engagement transition time of the engine connecting/disconnecting clutch K0 is long) and the attainment of the final engine torque Te corresponding to the request drive torque Touttgt is delayed. In contrast, in this example indicated by the solid lines, since the EV power running torque is limited during the engine start because of the relatively large request drive torque Touttgt, the torque converter 16 does not unnecessarily slip and the engine start is advanced (the engagement transition time of the engine connecting/disconnecting clutch K0 is shortened). Since the engine start is advanced, the attainment of the final engine torque Te corresponding to the request drive torque Touttgt is advanced. Since the engagement transition time of the engine connecting/disconnecting clutch K0 is shortened, a power consumption of the electric motor MG during the engine start is reduced. Since the EV power running torque is restrained from being consumed by a slip of the torque converter 16 in the initial period of the engine start (immediately after time t1), the substantial generation of the drive torque Tout is also advanced. On the other hand, in this example indicated by the dashed-two dotted lines, since the request drive torque Touttgt is relatively small, the follow-up performance to the request drive torque Touttgt during the engine start (e.g., from time t 1 to time t2') is more emphasized than the responsiveness to the final engine torque Te.

As described above, according to this example, at the engine start when the drive request amount is relatively small, the EV power running torque during the engine start is made relatively larger so that a large portion of the drive request amount can promptly be satisfied by the EV power running torque although the responsiveness of the engine start is reduced, which improves the initial follow-up performance to an increase in the drive request amount. On the other hand, at the engine start when the drive request amount is relatively large, the EV power running torque during the engine start is made relatively smaller so as to suppress an increase in the clutch differential rotation speed $\Delta$Nk and engage the engine connecting/disconnecting clutch K0 relatively earlier and, although the initial follow-up performance to an increase in the drive request amount is reduced, the responsiveness of the engine start is improved and the drive request amount is promptly realized only by the engine 14. Therefore, the drive request amount can be realized without a sense of discomfort at the engine start associated with an increase in the drive request amount.

According to this example, if the request drive torque Touttgt is equal to or less than the predetermined value A, the EV power running torque during the engine start is permitted to be up to the EV upper limit torque Tmevlim and, if the request drive torque Touttgt is larger than the predetermined value A, the EV power running torque during the engine start is made smaller than the EV upper limit torque Tmevlim when the request drive torque Touttgt is larger. As a result, at the engine start when the request drive torque Touttgt is equal to or less than the predetermined value A, a large portion of the request drive torque Touttgt can promptly be satisfied by the EV power running torque and the initial follow-up performance to an increase in the request drive torque Touttgt is properly improved. On the other hand, at the engine start when the request drive torque Touttgt is larger than the predetermined value A, the clutch differential rotation speed ΔNk is more restrained from increasing and the engine connecting/disconnecting clutch K0 is engaged relatively earlier when the request drive torque Touttgt is larger, and the responsiveness of the engine start is improved and the request drive torque Touttgt is promptly realized only by the engine 14.

According to this example, since the predetermined value A is a power limitation determination value of the electric motor MG empirically defined in advance as an upper limit value of the request drive torque Touttgt at which a sense of discomfort is not generated even if the generation of the engine torque Te is delayed, the request drive torque Touttgt can properly be realized without a sense of discomfort at the engine start associated with an increase in the request drive torque Touttgt.

According to this example, when the engine 14 is started, if the electric motor rotation speed Nm is lower, the EV power running torque during the engine start is made smaller as compared to the case that the electric motor rotation speed Nm is higher and, therefore, the increase in the clutch differential rotation speed ΔNk is suppressed and the engine connecting/disconnecting clutch K0 is engaged relatively earlier, which improves the responsiveness of the engine start.

According to this example, although the vehicle 10 is disposed with the torque converter and the electric motor rotation speed Nm is easily raised by the EV power running torque, since the EV power running torque during the engine start is made relatively smaller, the increase in the clutch differential rotation speed ΔNk is suppressed and the engine connecting/disconnecting clutch K0 is engaged relatively earlier, which improves the responsiveness of the engine start. Although the EV power running torque is consumed by a slip of the torque converter 16 (i.e., a rise in the electric motor rotation speed Nm) and hardly sent toward the drive wheels 34 because the torque converter is disposed, since the EV power running torque during the engine start is made relatively smaller, the increase in the electric motor rotation speed Nm is suppressed and an initial EV power running torque is more easily sent toward the drive wheels 34, which advances the substantial generation of the drive torque Tout.

Although the example of the present invention has been described in detail with reference to the drawings, the present invention is applicable in other forms.

For example, although the torque converter 16 is used as the fluid transmission device in the example, another fluid transmission device such as a fluid coupling without a torque amplification effect may be used instead of the torque converter 16. The lockup clutch 38 may not necessarily be disposed.

Although the vehicle 10 including the torque converter 16 is exemplarily illustrated in the example in the description of the present invention, the present invention is applicable to a vehicle without the torque converter 16. Although the phenomenon of increase in the clutch differential rotation speed ΔNk appears more remarkably if the torque converter 16 is included because of an increase in the EV power running torque during the engine start when the engine is started in association with an increase in the drive request amount, even if the torque converter 16 is not included, the phenomenon appears in association with a rise in the vehicle speed V, for example. Therefore, although a remarkable effect is acquired from the present invention in the vehicle 10 including the torque converter 16, a certain effect is acquired from the present invention even in a vehicle without the torque converter 16.

Although the vehicle 10 is disposed with the automatic transmission 18 in the example, the automatic transmission 18 may not necessarily be disposed.

The above description is merely an embodiment and the present invention can be implemented in variously modified and improved forms based on the knowledge of those skilled in the art.

NOMENCLATURE OF ELEMENTS

10: hybrid vehicle 14: engine 16: torque converter (fluid transmission device) 34: drive wheels 80: electronic control device (control device) K0: engine connecting/disconnecting clutch (connecting/disconnecting clutch) MG: electric motor

The invention claimed is:

1. A control device of a hybrid vehicle including an engine, an electric motor configured to output power for running and power necessary for starting the engine, and a connecting/disconnecting clutch connecting/disconnecting a power transmission path between the engine and the electric motor, the control device configured to start the engine while the connecting/disconnecting clutch is controlled toward engagement during motor running for running by using only the electric motor as a drive force source for running with the connecting/disconnecting clutch released,
  when the engine is started in association with an increase in a drive request amount to the hybrid vehicle, if the drive request amount is large, the power for running from the electric motor during start of the engine being made smaller as compared to the case that the drive request amount is small.

2. The control device of a hybrid vehicle of claim 1, wherein
  if the drive request amount is equal to or less than a predetermined value, the power for running from the electric motor during start of the engine is permitted to be up to predefined upper limit electric motor power at which the motor running can be performed, and wherein
  if the drive request amount is larger than the predetermined value, the power for running from the electric motor during start of the engine is made smaller than the upper limit electric motor power when the drive request amount is larger.

3. The control device of a hybrid vehicle of claim 2, wherein the predetermined value is a power limitation determination value of the electric motor defined in advance as an upper limit value of the drive request amount at which a sense of discomfort is not generated even if generation of power for running from the engine is delayed.

4. The control device of a hybrid vehicle of claim 1, wherein when the engine is started, if a rotation speed of the electric motor is lower, the power for running from the electric motor during start of the engine is made smaller as compared to the case that the rotation speed of the electric motor is higher.

5. The control device of a hybrid vehicle of claim 1, wherein a fluid transmission device is disposed in a power transmission path between the electric motor and drive wheels.

* * * * *